United States Patent
Geslin et al.

(10) Patent No.: US 8,626,066 B2
(45) Date of Patent: Jan. 7, 2014

(54) NEAR FIELD COMMUNICATION DEVICE

(75) Inventors: Jeremy Geslin, Caen (FR); Jerome Pele, Caen (FR)

(73) Assignee: NXP B.V., Eindhoven (NL)

( * ) Notice: Subject to any disclaimer, the term of this patent is extended or adjusted under 35 U.S.C. 154(b) by 613 days.

(21) Appl. No.: 12/882,191

(22) Filed: Sep. 14, 2010

(65) Prior Publication Data

US 2011/0065385 A1 Mar. 17, 2011

(30) Foreign Application Priority Data

Sep. 14, 2009 (EP) .................................... 09290699

(51) Int. Cl.
*H04B 7/00* (2006.01)

(52) U.S. Cl.
USPC ... 455/41.2; 455/41.1; 455/414.1; 455/432.2; 370/259; 235/493

(58) Field of Classification Search
USPC ......... 455/41.2, 41.1, 414.1, 432.2, 466, 411, 455/433; 370/259, 260; 235/493, 379, 380
See application file for complete search history.

(56) References Cited

U.S. PATENT DOCUMENTS

| | | | | |
|---|---|---|---|---|
| 7,213,766 | B2 * | 5/2007 | Ryan et al. ...................... | 235/492 |
| 7,657,255 | B2 * | 2/2010 | Abel et al. ................. | 455/414.1 |
| 7,929,456 | B2 * | 4/2011 | Breitfuss ...................... | 370/252 |
| 8,098,689 | B2 * | 1/2012 | Trainin .......................... | 370/474 |
| 8,103,249 | B2 * | 1/2012 | Markison ...................... | 455/411 |
| 8,313,037 | B1 * | 11/2012 | Humphrey ................... | 235/493 |
| 8,376,239 | B1 * | 2/2013 | Humphrey ................... | 235/493 |
| 8,396,455 | B2 * | 3/2013 | Carlson et al. ............. | 455/412.2 |
| 2007/0197261 | A1 * | 8/2007 | Humbel ........................ | 455/558 |
| 2007/0262860 | A1 * | 11/2007 | Salinas et al. ............ | 340/539.12 |
| 2009/0023476 | A1 | 1/2009 | Saarisalo et al. | |
| 2009/0327151 | A1 * | 12/2009 | Carlson et al. ................... | 705/80 |
| 2010/0075638 | A1 * | 3/2010 | Carlson et al. ............. | 455/412.1 |
| 2011/0234379 | A1 * | 9/2011 | Lee ............................... | 340/10.1 |
| 2011/0264543 | A1 * | 10/2011 | Taveau et al. ................... | 705/23 |

FOREIGN PATENT DOCUMENTS

EP  0 940 961 A  9/1999

OTHER PUBLICATIONS

"EMV Contactless Communication Protocol Specification v2.0" EMVco, 159 pgs. (Aug. 2007).
European Extended Search Report for Patent Appln. EP 09290699.9 (Dec. 22, 2009).

* cited by examiner

*Primary Examiner* — Minh D Dao

(57) ABSTRACT

A near field communication device being operable in a first operating state and a second operating state, the near field communication device comprising a communication unit adapted for communicating with an external device; and a control unit coupled to the communication unit; wherein the control unit is adapted for controlling the communication unit to be presented to the external device to be in the first operating state and supporting the second operating state, and wherein the control unit is adapted for switching the communication unit from the first operating state to the second operating state upon receipt of a configuration signal received from the external device.

11 Claims, 3 Drawing Sheets

NEAR FIELD COMMUNICATION DEVICE

This application claims the priority of European patent application no. 09290699.9, filed on Sep. 14, 2009, the contents of which are incorporated by reference herein.

BACKGROUND OF THE INVENTION

The number of applications used in mobile devices, in particular mobile phones, increases more and more. Thus, the way of communication carried out by mobile phones changes. For example Near Field Communication (NFC) is being adopted by mobile phones for various applications like smart posters, ticketing, payments etc.

Near Field Communication or NFC is a short-range high frequency wireless communication technology which enables the exchange of data between devices over about a 10 centimeters (around 4 inches) distance. The technology is a simple extension of the ISO/IEC 14443 proximity-card standard (contactless card, RFID) that combines the interface of a smartcard and a reader into a single device. An NFC device can communicate with both existing ISO/IEC 14443 smartcards and readers, as well as with other NFC devices, and is thereby compatible with existing contactless infrastructure already in use for public transportation and payment. NFC is primarily aimed at usage in mobile phones.

NFC technology (standardized in ISO/IEC 18092) is currently mainly aimed at being used with mobile phones. There are three main use cases for NFC:

Card emulation: the NFC device behaves like an existing contactless card (e.g. payment, ticketing, transport, access control . . . )

Reader mode: the NFC device is active and read a passive RFID tag, for example for interactive advertising P2P mode: two NFC devices are communicating together and exchanging information (e.g. easy peering connection, data transfers from device to device . . . )

When a NFC device may provide the card emulation and the P2P mode in parallel, this may lead to a collision at the RF side, i.e. the side of an external device.

BRIEF DESCRIPTION OF THE DRAWINGS

The invention will be described in more detail hereinafter with reference to examples of embodiment but to which the invention is not limited.

The illustration in the drawing is a schematic illustration. In different drawings, similar or identical elements are provided with the same reference signs.

DETAILED DESCRIPTION

Figure 1:
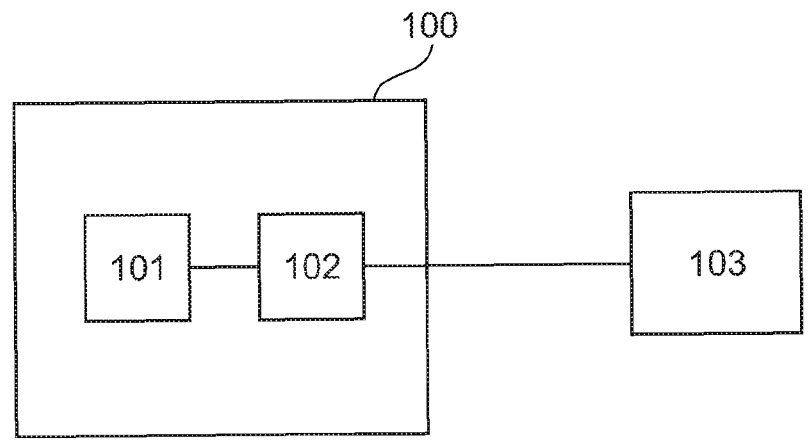
FIG. 1 illustrates a near field communication device according to an exemplary embodiment of the invention.

According to an exemplary embodiment of the invention, a near field communication device is provided, being operable in a first operating state and a second operating state, the near field communication device comprising a communication unit adapted for communicating with an external device and a control unit coupled to the communication unit, wherein the control unit is adapted for controlling the communication unit to be presented to the external device to be in the first operating state and supporting the second operating state, and wherein the control unit is adapted for switching the communication unit from the first operating state to the second operating state upon receipt of a configuration signal received from the external device.

According to another exemplary embodiment of the invention, a method for operating a near field communication device in a first and a second operating state is provided, the method comprising controlling a communication unit by a control unit for presenting the communication unit to an external device to be in the first operating state and supporting the second operating state, and switching the communication unit from the first operating state to the second operating state upon receipt of a configuration signal received from the external device.

According to another exemplary embodiment of the invention, a communication system is provided comprising a near field communication device with the above mentioned features and an external device.

According to still another exemplary embodiment of the invention, a program element (for instance a software routine, in source code or in executable code) is provided, which, when being executed by a processor, is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor, is adapted to control or carry out a method having the above mentioned features.

Operating a near field communication device in a first and a second operating state which may be performed according to embodiments of the invention can be realized by a computer program, that is by software, or by using one or more special electronic optimization circuits, that is in hardware, or in hybrid form, that is by means of software components and hardware components.

The term "near field communication" (NFC) may denote a short-range high frequency wireless communication technology which enables the exchange of data between devices over short distances, for example 10 centimeters or around 4 inches. The technology is a simple extension of the ISO/IEC 14443 proximity-card standard (contactless card, RFID) that combines the interface of a smartcard and a reader into a single device. An NFC device may communicate with both existing ISO/IEC 14443 smartcards and readers, as well as with other NFC devices, and is thereby compatible with existing contactless infrastructure already in use for public transportation and payment. NFC and thus this invention may for example be used in mobile phones.

The term "communication unit" may denote for example a module responsible for the communication with external devices.

The term "control unit" may denote any kind of unit which is able to control the communication unit and to switch the communication unit between a first operating state and a second operating state. The communication unit and the control unit may be formed on a single chip or as separate units.

According to an embodiment of the invention, the conflict between for example card emulation and P2P features may be solved by implementing a specific way of handling this case in the NFC device. The basis of the solution may be to expose only the card emulation feature, first operating state, but modifying the RF initialization parameters to also expose P2P capabilities, supporting second operating state.

In the following, further exemplary embodiments of the near field communication device will be explained. However, these embodiments also apply to the communication system, to the method, to the program element and to the computer-readable medium.

According to an embodiment of the invention, it may be possible that, in the first operating state, the communication unit is adapted for providing a service of a contactless card. The NFC device may behave like an existing contactless card for example for payment, ticketing, transport, access control. The communication between the NFC device and the external device may be unidirectional.

According to an embodiment of the invention, in the second operating state, the communication unit is adapted for exchanging information with the external device. This may be called P2P mode, wherein two NFC devices are communicating together and exchanging information, for example easy peering connection, data transfers from device to device. The communication between the NFC device and the external device may be bidirectional.

According to an embodiment of the invention, the communication unit is adapted for receiving a communication initialization signal from the external device and for sending a response signal to the external device in response to receipt of the communication initialization signal, wherein the response signal comprises information presenting the device to the external device to be in the first operating state and supporting the second operating state. In this embodiment, the parameters of the two operating states may be merged during the RF initialization to only expose one "card" to the external reader. This "merge card" may own parameters showing the support of the two operating states. Concretely, the RF initialization parameter named "SAK" defined by ISO/IEC 14443 standard, renamed as "SEL_RES" by ISO/IEC 18092 standard, may indicate the support of the ISO/IEC 18092 protocol thanks to one bit (bit 6). Then, only the card emulation parameters for the RF initialization may be used, setting the relevant bit of the SAK to indicate P2P support.

According to an embodiment of the invention, the communication unit is adapted for receiving the configuration signal indicative of a selection by the external device, which of the first and the second operating state is selected. The external reader may select the related feature according to its own application by means of an upper layer command during the last stage of RF initialization (either ISO/IEC 14443 RATS command, or ISO/IEC 18092 ATR_REQ command, or even a proprietary command).

According to an embodiment of the invention, the device is a mobile device.

According to a further embodiment of the invention, the device is realised as at least one of the group consisting of a mobile phone, a hearing aid, a dictating machine, a conference call device, a portable audio player, a portable video player, a head mounted display, a medical communication system, a body-worn device, a DVD player, a CD player, a harddisk-based media player, an internet radio device, a public entertainment device, and an MP3 player.

In the following, further exemplary embodiments of the communication system will be explained. However, these embodiments also apply to the near field communication device, to the method, to the program element and to the computer-readable medium.

According to an embodiment of the invention, the external device is a mobile host. A mobile host may be any kind of external device or portable terminal which may be connectable to the communication unit.

The near field communication (NFC) device may be adapted for wireless communication with the external device which may be particularly a reading device, for reading data from the NFC device. For this purpose, the NFC device and the reading device may comprise corresponding transmission elements. For instance, the NFC device may comprise an antenna, wherein the reading device may comprise a corresponding receiving antenna. However, the inventive device is not limited to wireless or contactless data transmission, but in principle also applies to wireless communication.

The aspects defined above and further aspects of the invention are apparent from the examples of embodiment to be described hereinafter and are explained with reference to these examples of embodiment.

Figure 2:
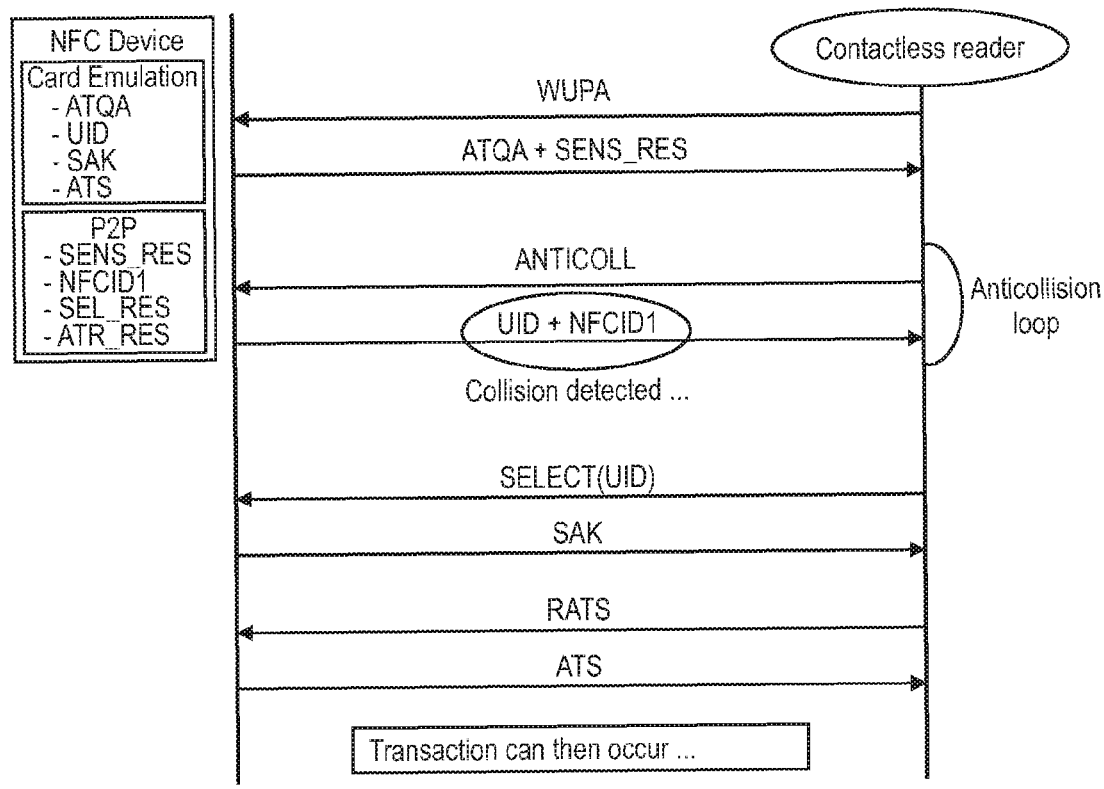
FIG. 2 illustrates a communication between a NFC device and an external device in a transactional flow diagram according to a common system.

In a communication system, a NFC device behaves as a "real" contactless card (as defined by ISO/IEC 14443 standard) in order to provide card emulation features. It implies, for the type A part, answering to the RF initialization. When the NFC device provides P2P feature (as defined by ISO/IEC 18092 standard) it shall also answer to the RF initialization. In case the NFC device provides both features in parallel, it leads to a collision at RF side which has to be resolved by the external NFC device as shown in FIG. 2. Most of contactless readers in the field (especially for payment or transport) are not supporting the collision preventing then any transaction.

FIG. 2 shows a flow diagram of RF initialization from an external ISO/IEC 14443 reader. The external device or contactless reader receives in response to the initialization signal a signal referring to card emulation and to P2P mode. Thus, a collision occurs, which has to be solves by the NFC device.

Figure 3:
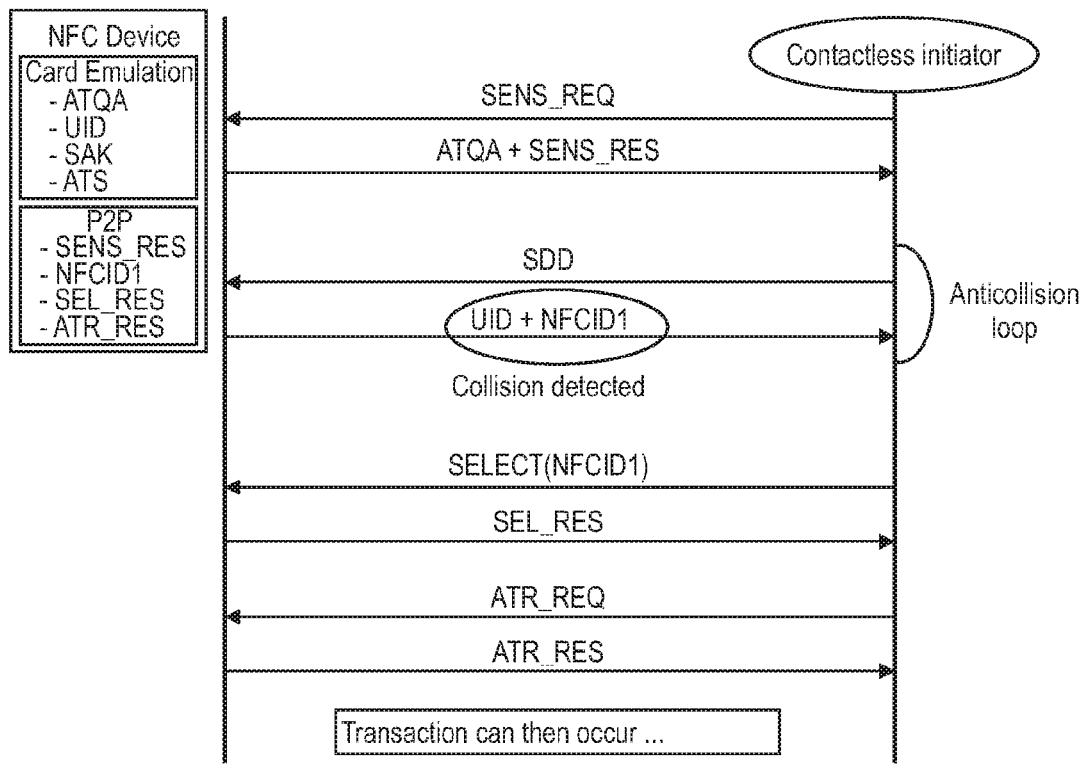
FIG. 3 illustrates a communication between a NFC device and an external device in a transactional flow diagram according to a further common system.

FIG. 3 shows a transactional flow diagram according to a further common system. In front of an ISO/IEC 18092 initiator, that means a further NFC device, the NFC device would behave as NFC device in a P2P mode. A collision would occur as in FIG. 2.

A solution to expose both features with no collision at RF side is required to allow the NFC system (integrating the NFC device) enabling different types of application at the same type which is the real interest of NFC technology.

According to the invention, it is proposed to resolve the conflict between card emulation and P2P features by implementing a specific way of handling this case in the NFC device. The basis of the solution is to expose only the card emulation feature but modifying the RF initialization parameters to also expose P2P capabilities.

In FIG. 1, a near field communication device 100 is shown being operable in a first operating state and a second operating state. The near field communication device 100 comprises a communication unit 102 adapted for communicating with an external device 103. A control unit 101 is coupled to the communication unit. The control unit is adapted for controlling the communication unit to be presented to the external device to be in the first operating state and supporting the second operating state. The control unit is further adapted for switching the communication unit from the first operating state to the second operating state upon receipt of a configuration signal received from the external device.

Principle of the solution is to merge the parameters of the different modes, i.e. operating states, during the RF initialization to only expose one "card" to the external reader. This "merge card" owns parameters showing the support of the two modes. Concretely, the RF initialization parameter named "SAK" defined by ISO/IEC 14443 standard, renamed as "SEL_RES" by ISO/IEC 18092 standard, indicates the support of the ISO/IEC 18092 protocol thanks to one bit (bit 6). The solution proposed is then to make use of only the card emulation parameters for the RF initialization, setting the relevant bit of the SAK to indicate P2P support. The external reader selects then the related feature according to its own application by means of an upper layer command during the last stage of RF initialization (either ISO/IEC 14443 RATS command, or ISO/IEC 18092 ATR_REQ command, or even a proprietary command).

Figure 4:
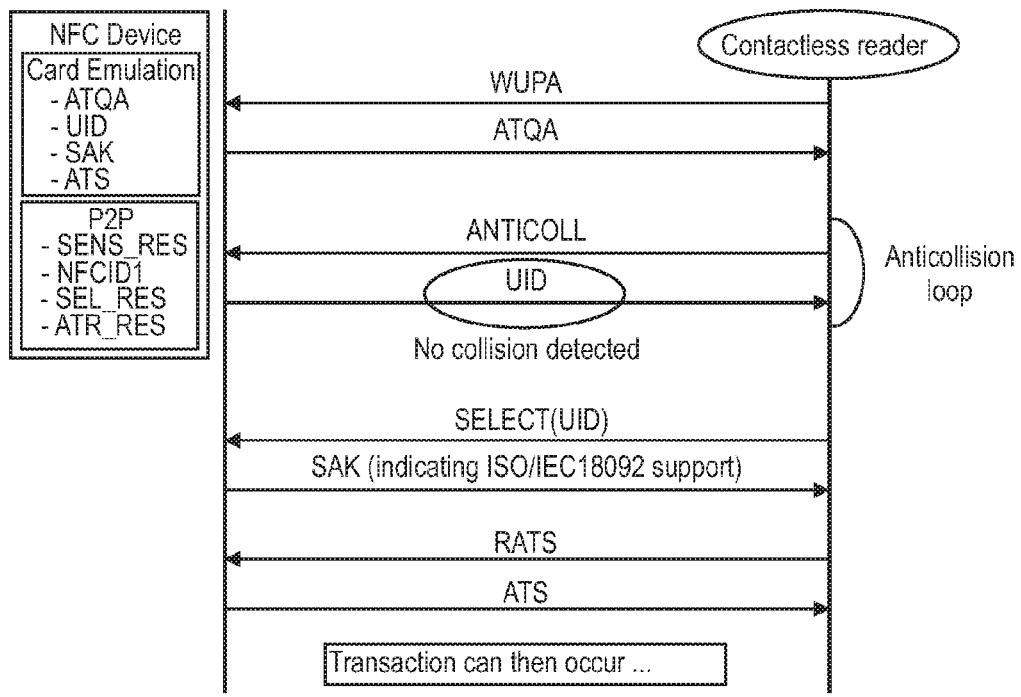
FIG. 4 illustrates a communication between a NFC device and an external device in a transactional flow diagram according to an exemplary embodiment of the invention.

In FIG. 4, a transactional flow diagram is shown detailing the proposed solution implemented in the NFC device to avoid the collision detection by an ISO/IEC 14443 reader. In response to an initialization signal (WUPA) only a response signal referring to card emulation is sent back showing that also the P2P functions are supported. Thus, no collision may occur. The external device (contactless reader) may then select the card emulation mode.

Figure 5:
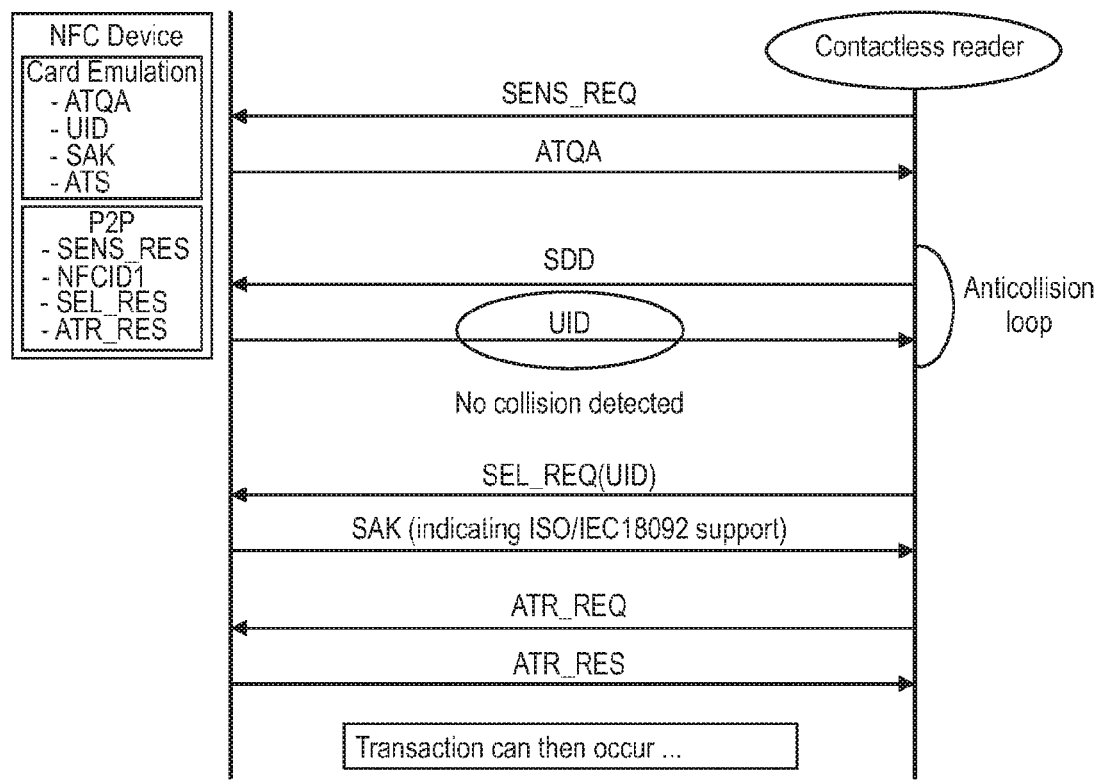
FIG. 5 illustrates a communication between a NFC device and an external device in a transactional flow diagram according to a further exemplary embodiment of the invention.

In FIG. 5, a transactional flow diagram is shown, wherein, in contrast to the diagram of FIG. 4, the P2P mode is selected. Also in this case, no collision occurs thanks to the response signal of the NFC device presenting to be in the first operation mode and supporting the second operation mode.

The proposed solution to resolve the conflict allows enabling in parallel both the card emulation and the P2P features without any collision at RF side which is mandatory if the user wants to keep activated P2P applications and card emulation ones.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A near field communication device being operable in a first operating state corresponding to a card emulation feature and a second operating state corresponding to peer to peer support, the near field communication device comprising
   a communication unit adapted for communicating with an external device; and
   a control unit coupled to the communication unit;
   wherein the control unit is adapted for controlling the communication unit to be presented to the external device to be in the first operating state by exposing the card emulation feature using only the card emulation parameters for RF initialization and supporting the second operating state by modifying the card emulation parameters to also indicate peer to peer support, and
   wherein the control unit is adapted for switching the communication unit from the first operating state to the second operating state upon receipt of a configuration signal received from the external device, wherein in the first operating state, the communication unit is adapted for providing a service of a contactless card.

2. The near field communication device according to claim 1, wherein in the second operating state, the communication unit is adapted for exchanging information with the external device.

3. The near field communication device according to claim 1, wherein the communication unit is adapted for receiving a communication initialization signal from the external device and for sending a response signal to the external device in response to receipt of the communication initialization signal, wherein the response signal comprises information presenting the device to the external device to be in the first operating state and supporting the second operating state.

4. The near field communication device according to claim 1, wherein the communication unit is adapted for receiving the configuration signal indicative of a selection by the external device, which of the first and the second operating state is selected.

5. The near field communication device according to claim 1, wherein the device is a mobile device.

6. The near field communication device according to claim 1, realised as at least one of the group consisting of a mobile phone, a hearing aid, a dictating machine, a conference call device, a portable audio player, a portable video player, a head mounted display, a medical communication system, a body-worn device, a DVD player, a CD player, a harddisk-based media player, an internet radio device, a public entertainment device, and an MP3 player.

7. A communication system comprising a near field communication device of claim 1 and an external device.

8. The communication system according to claim 1, wherein the external device is a mobile host.

9. Method for operating a near field communication device in a first operating state corresponding to a card emulation feature and a second operating state corresponding to peer to peer support, the method comprising
   controlling a communication unit by a control unit for presenting the communication unit to an external device to be in the first operating state by exposing the card emulation feature using only the card emulation parameters for RF initialization and supporting the second operating state by modifying the card emulation parameters to also indicate peer to peer support, and
   switching the communication unit from the first operating state to the second operating state upon receipt of a configuration signal received from the external device wherein, in the first operating state, the communication unit is adapted for providing a service of a contactless card.

10. A computer-readable medium, in which a computer program of operating a near field communication device in a first and a second operating state is stored, which computer program, when being executed by a processor, is adapted to carry out or control a method according to claim 9.

11. A near field communication device being operable in a first operating state and a second operating state, the near field communication device comprising
   a communication unit adapted for communicating with an external device;
   a control unit coupled to the communication unit;
   wherein the control unit is adapted for controlling the communication unit to be presented to the external device to be in the first operating state and supporting the second operating state,
   wherein the control unit is adapted for switching the communication unit from the first operating state to the second operating state upon receipt of a configuration signal received from the external device, wherein in the first operating state, the communication unit is adapted for providing a service of a contactless card, and
   wherein the communication unit is adapted for receiving the configuration signal indicative of a selection by the external device, which of the first and the second operating state is selected.

* * * * *